United States Patent [19]

Long et al.

[11] Patent Number: 4,931,335

[45] Date of Patent: Jun. 5, 1990

[54] UNDERWATER DIVER'S DRY SUIT AND METHOD OF SEALING

[75] Inventors: Richard W. Long; Robert T. Stinton, both of San Diego, Calif.

[73] Assignee: Diving Unlimited International, Inc., San Diego, Calif.

[21] Appl. No.: 395,529

[22] Filed: Aug. 18, 1989

Related U.S. Application Data

[60] Division of Ser. No. 182,384, Apr. 18, 1988, Pat. No. 4,882,785, which is a division of Ser. No. 694,703, Jan. 23, 1985, Pat. No. 4,778,643, which is a continuation of Ser. No. 476,472, May 25, 1983, abandoned, which is a division of Ser. No. 372,625, Apr. 28, 1982, Pat. No. 4,388,134.

[51] Int. Cl.⁵ ............................................. B32B 3/02
[52] U.S. Cl. ........................................... 428/57; 428/58; 428/60; 428/61; 428/63
[58] Field of Search ............... 428/57, 58, 60, 61, 428/63

[56] References Cited

U.S. PATENT DOCUMENTS

| | | | |
|---|---|---|---|
| 1,899,067 | 2/1933 | Trumbull | 156/258 |
| 3,294,617 | 12/1966 | Way | 428/61 |
| 3,370,117 | 2/1968 | Blue | 264/321 |
| 3,404,406 | 10/1968 | Balliet | 2/2.1 |
| 3,686,064 | 8/1972 | Bonnet et al. | 428/252 |
| 3,714,078 | 1/1973 | Gordon et al. | 521/65 |
| 3,804,700 | 4/1974 | Hoey | 428/196 |
| 3,854,983 | 12/1974 | Brodnyan | 428/328 |
| 3,891,487 | 6/1975 | Hoey | 156/78 |
| 3,906,137 | 9/1975 | Bauer | 428/316.6 |
| 3,966,532 | 6/1976 | Harasta | 156/344 |
| 4,156,054 | 5/1979 | Gurewitsch | 428/57 |
| 4,299,883 | 11/1981 | Roth et al. | 428/332 |
| 4,387,128 | 6/1983 | Emms et al. | 428/60 |

Primary Examiner—William J. Van Balen
Attorney, Agent, or Firm—Brown, Martin, Haller & McClain

[57] ABSTRACT

A material for use in making at least part of an underwater diver's dry suit comprises at least two sections of a composite material abutted and secured together along a pair of adjacent edges, the material comprising an outer layer of waterproof material, an inner layer of material, and a middle layer of permanently collapsible cellular material, the abutted edges comprising a seam line formed by compressing the material of both sections to permanently collapse the cellular material of the middle layer.

6 Claims, 1 Drawing Sheet

UNDERWATER DIVER'S DRY SUIT AND METHOD OF SEALING

This is a Division of Application Ser. No. 182,384 filed Apr. 18, 1988, now U.S. Pat. No. 4,882,785, which was a Division of Ser. No. 694,703 filed Jan. 23, 1985, now U.S. Pat. No. 4,778,643, which was a Continuation of Application Ser. No. 476,472 filed May 25, 1983, (abandoned) which was a Division of Application Ser. No. 372,625 filed Apr. 28, 1982, now known as U.S. Pat. No. 4,388,134.

BACKGROUND OF THE INVENTION

The invention relates to dry suits used by underwater divers and more particularly to a material for use in making at least part of such suits.

Dry suits are generally made with a foam rubber core that is laminated on both faces with a nylon jersey knit glued to the core material. The sections of the suit are glued together and then sewn on the outside. In time, the adhesive becomes brittle. Stretching the suit as it is put on and taken off causes the adhesive to crack and Water leaks through. This is normally referred to as "pin holing".

The normal procedure for correcting pin holing is to coat the inside of the seam with adhesive three or four times and then put a piece of nylon jersey knit rubber stripping over the seam. However, it is impossible to get complete penetration of the glue through the nylon jersey knit into the rubber foam underneath. Consequently, water migrates in between the nylon and the rubber foam to which it is affixed. The water passes the glued area and leaks into the suit.

SUMMARY

According to the present invention, a material for use in making at least part of a diver's dry suit is provided which comprises at least two sections of a composite material abutted and secured together along at least one pair of adjacent edges, the material comprising an outer layer of waterproof material, an inner layer of material and a middle layer of permanently collapsible cellular material disposed between the outer and inner layers, and the abutted edges comprising a seam line formed by compressing the material of both sections to permanently collapse the cellular material of the middle layer. This provides a much stronger seam.

DETAILED DESCRIPTION OF THE DRAWINGS

Figure 1:
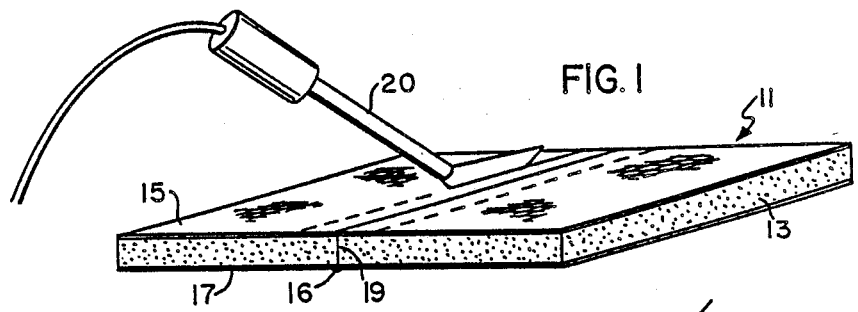
FIG. 1 is a perspective view of a section of an underwater diver's dry suit demonstrating the step of burning along a line on each side of the seam.

Referring to the drawings, a portion of dry suit for underwater divers is shown at 11. The suit includes a foam core 13 of material such as foam rubber. The faces of the core 13 are covered with layers 15 and 17 of material such as nylon jersey. The layers of nylon jersey are affixed to the core 13 with a suitable adhesive. The nylon layers are sewn to the core and to each other with blind stitches 16. This provides a generally satisfactory construction. However, after a certain amount of time, the adhesive dries and cracks and the continual putting on and taking off of the suit causes the adhesive to deteriorate in the seams and cause small pin hole leaks. Water leaks into the inside of the suit and causes the diver to become wet, cold and uncomfortable.

Figure 2:
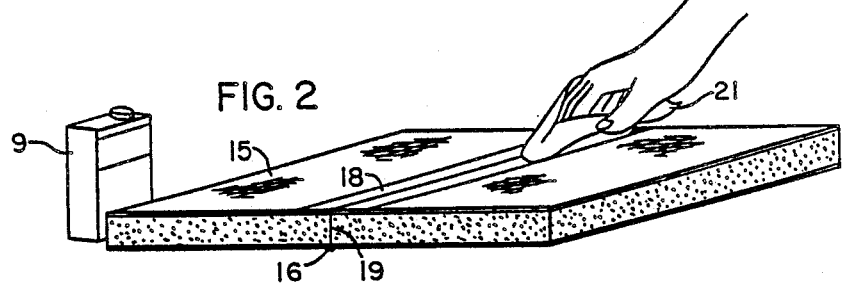
FIG. 2 a shows the step of impregnating the isolated strip over the seam with a solvent such as toluene.
Figure 3:
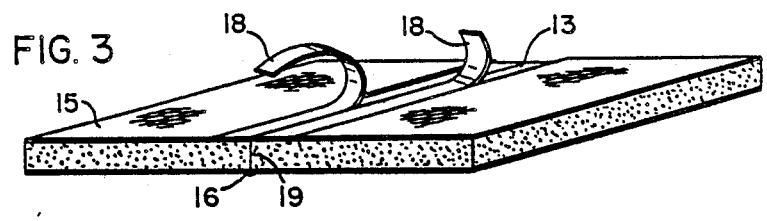
FIG. 3 demonstrated the step of removing the isolated strip from over the seam.
Figure 4:
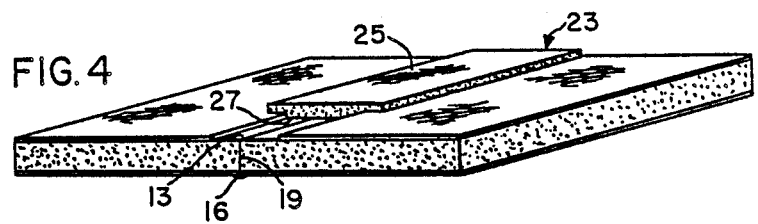
FIG. 4 shows the positioning of a sealing strip over the exposed core along the seam of the dry suit.
Figure 5:
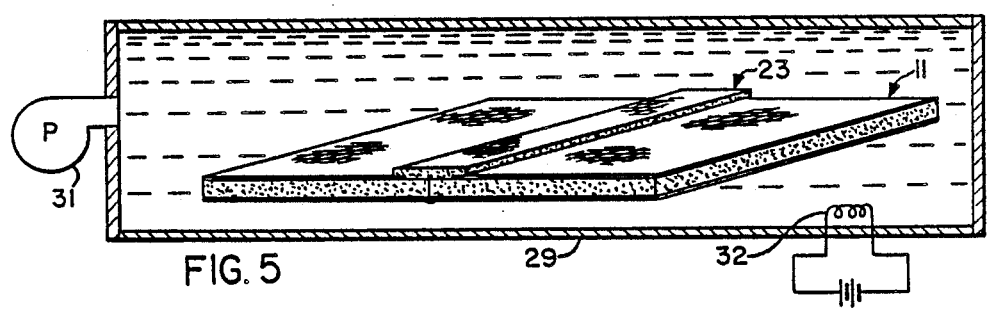
FIG. 5 demonstrates the step of compressing the dry suit and seal in heated water under pressure.

The material of the present invention eliminates this problem and provides a watertight seal along the seams of the suit. Strips 18 of the nylon layer 15 are removed from along the seam 19 on the inside of the suit. One way of doing this is shown in FIG. 1 of the drawings. A heated iron 20 is run along the layer of nylon 15 on the inside of the suit on a line approximately one-quarter inch to three-eighths inch from the seam 19 of the suit sections on each side of the seam. Thus, the strips 18 of nylon are detached or isolated from the rest of the layer 15 because the nylon along the path of the iron is incinerated and destroyed. These isolated strips are still affixed to the foam core 13 by the adhesive and the next step is to release the strips 18 from the foam core 13 so that the foam core is exposed without destroying the foam core. One method of doing this is to pass a cloth 21 containing toluene from source 9 over the strips 18 as shown in FIG. 2. The fumes from the cloth 21 dissolve or weaken the adhesive. The strips 18 can now be removed as shown in FIG. 3, leaving the surface of the core 13 of foam material exposed. The nylon strips 18 are approximately three-eighths inch wide.

Next, a strip 23 composed of an outer layer 25 of material such as nylon jersey and an inner layer 27 of foam material such as closed cell foam rubber is positioned over the core surface 13 with the foam of the core surface 13 facing the foam 27 on the strip 23, and with an adhesive between the foam sections to bond them together in a foam to foam connection. The result is a strip 23 approximately three-quarters inch wide on the interior of the suit with the foam 27 of the strip 25 adhering to the foam 13 of the suit. This foam to foam contact along the seam gives complete watertight seal.

The result is a complete seal on the inside of the suit and water cannot leak through the seam. Even if water leaks through the seam itself, the water cannot migrate between the nylon and the rubber foam because the nylon has been removed over the seam and the foam to foam contact provides a one-hundred percent seal.

This seal may be further guaranteed by a procedure which reduces the size of the bubbles in the foam. The above sealing procedure is accomplished after the sections of the suit are cut and sewn together. There are many pressure/temperature/time profiles to compress the foam. The one hereinafter discussed is the most efficient we have found to date. Within a week after the construction of the suit, the suit is placed inside a pressure chamber 29 that is filled with water. At a controlled temperature such as is about 60 degrees F. to 75 degrees F. provided by heater 32, the chamber is pressurized by means such as a hydrostatic pump 31 to approximately 500 pounds per square inch pressure. The suit is left at this temperature and pressure for approximately twenty-four to forty-eight hours. As a result, the cellular material in the core of the suit collapses, reducing the size of the cellular bubbles and rendering the suit and seals much stronger. This procedure removes some of the stretch in the material and the material will not return to its original condition.

A diving suit using this technique may utilize a thin foam material about three thirty seconds inch thick. As discussed above, this foam material has a layer of nylon type material on each face. A durable nylon layer is provided on the outside of the suit. This is preferably a canvas type material. The ability to withstand wear is increased considerably When the suit is processed through the compression procedure, it is permanently collapsed. The material has very little compression left and it changes little in thermal conductivity or buoyancy.

Since the buoyancy of the compressed suit does not change with depth, the thermal protection and buoyancy of the garment are constant and independent of depth. The surface buoyancy and "at depth" buoyancy are virtually the same, and the diver is not required to make buoyancy adjustments. Stretch of the diving suit material is reduced and the material is stronger.

Having thus described our invention, we claim:

1. A material for use in making at least part of a dry suit comprising:
at least two sections of a composite material abutted and secured together along at least one pair of adjacent edges, the material comprising an outer layer of waterproof material, an inner layer of material, and a middle layer of permanently collapsible cellular material disposed between said outer layer and said inner layer, the abutted edges comprising a seam line formed by compressing the material of both sections to permanently collapse the cellular material of the middle layer.

2. The material according to claim 1, wherein the middle layer is three thirty seconds of an inch thick.

3. The material according to claim 1, wherein the middle layer is formed of closed cell cellular material.

4. The material according to claim 3, wherein the cellular material is foam rubber.

5. The material according to claim 1, wherein the cellular material is permanently compressed such that it has very little compression and substantially constant thermal conductivity and buoyancy with depth.

6. The material as claimed in claim 1, wherein said inner layer of material terminates short of the edge of each section which abuts the adjacent section edge to expose a strip of underlying cellular material, and a cover strip of cellular material and cover material is laminated over the exposed abutting edges of said strips of cellular material with its cellular material inwards, said cellular material of said cover strip also being compressed to permanently collapse to the cellular material of said cover strip.

* * * * *